United States Patent
Wessells et al.

(10) Patent No.: US 8,672,278 B1
(45) Date of Patent: *Mar. 18, 2014

(54) MULTIUSE DEVICE MOUNTING SYSTEM AND METHOD

(75) Inventors: Philip G. Wessells, Mill Valley, CA (US); Andrew Lee Choy, San Francisco, CA (US); Michael E. Woods, Brisbane, CA (US)

(73) Assignee: Grifiti LLC, Jackson, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,720

(22) Filed: Jun. 11, 2012

Related U.S. Application Data (60) Continuation of application No. 12/885,513, filed on Sep. 19, 2010, now Pat. No. 8,196,878, which is a division of application No. 10/618,847, filed on Jul. 14, 2003, now Pat. No. 7,798,452.

(51) Int. Cl.
*F16M 11/00* (2006.01)

(52) U.S. Cl.
USPC .................. 248/163.1; 248/177.1; 248/176.3

(58) Field of Classification Search
USPC ............. 248/181.1, 176.1, 163.1, 168, 176.3, 248/187.1, 440, 160, 432, 434, 435
See application file for complete search history.

(56) References Cited

U.S. PATENT DOCUMENTS

| | | | |
|---|---|---|---|
| 1,988,022 A | 1/1935 | Smith | |
| 2,622,496 A | 12/1952 | Owens | |
| 2,682,816 A | 7/1954 | Walden | |
| 2,684,822 A | 7/1954 | Odin | |
| 2,810,819 A | 10/1957 | Gibson | |
| 3,742,835 A | 7/1973 | Bahnsen | |
| 3,804,356 A | 4/1974 | Olds | |
| 4,285,588 A | 8/1981 | Mir | |
| 4,492,451 A | 1/1985 | Maassen et al. | |
| 4,629,150 A | 12/1986 | O'Callaghan et al. | |
| 4,648,697 A | 3/1987 | Kawazoe | |
| 4,685,157 A * | 8/1987 | James | 4/254 |
| 4,908,642 A | 3/1990 | Komatsuzaki et al. | |
| 4,963,903 A | 10/1990 | Cane | |
| 5,043,750 A | 8/1991 | Yamaguchi | |
| 5,063,403 A | 11/1991 | Yokonuma et al. | |
| 5,097,284 A | 3/1992 | Taniguchi et al. | |
| 5,159,379 A | 10/1992 | Shirane et al. | |

(Continued)

OTHER PUBLICATIONS http://www.pinecomputer.com/pinecom/minsnaktrip.html—product represented is a conventional flexible legged mini-tripod (product unknown).

(Continued)

*Primary Examiner* — Steven Marsh
(74) *Attorney, Agent, or Firm* — Patent Law Offices of Michael E. Woods; Michael E. Woods (57) ABSTRACT

A multiuse platform and system having a flexible shape-retaining shaft for engaging, holding and pointing devices (e.g., imaging devices like cameras or video recorders). It includes a respositionable mounting system having a flexible assembly having a first end and a second end, the assembly adapted to be repetitively positioned into a plurality of orientations by moving the assembly into a first particular orientation wherein the assembly retains the particular orientation until the assembly is moved into a second particular orientation; and a first mounting head, coupled to the first end, for engaging a first mating structure.

4 Claims, 7 Drawing Sheets

(56) References Cited

U.S. PATENT DOCUMENTS

| | | |
|---|---|---|
| 5,164,759 A | 11/1992 | Yasukawa |
| 5,176,442 A | 1/1993 | Richardson |
| 5,202,720 A | 4/1993 | Fujino et al. |
| 5,262,809 A | 11/1993 | Nishimura et al. |
| 5,285,232 A | 2/1994 | Taniguchi et al. |
| 5,317,362 A | 5/1994 | Takahashi |
| 5,424,794 A | 6/1995 | McKay |
| 5,448,331 A | 9/1995 | Hamada et al. |
| 5,517,392 A | 5/1996 | Rousso et al. |
| 5,521,803 A | 5/1996 | Eckert et al. |
| 5,528,325 A | 6/1996 | Perez |
| 5,567,115 A | 10/1996 | Carbone |
| 5,687,402 A | 11/1997 | Kishimoto et al. |
| 5,752,097 A | 5/1998 | McIntyre |
| 5,906,426 A | 5/1999 | Farrington et al. |
| 5,931,560 A | 8/1999 | Hoffman |
| 5,937,537 A | 8/1999 | Miller |
| 5,944,407 A | 8/1999 | Lynch et al. |
| 6,164,570 A | 12/2000 | Smeltzer |
| 6,540,184 B2 | 4/2003 | Thaxton |
| 6,772,778 B2 | 8/2004 | Morosini et al. |
| 7,621,491 B2 * | 11/2009 | Law .......................... 248/163.2 |
| 7,798,452 B1 * | 9/2010 | Wessells et al. ........... 248/163.1 |
| 7,959,116 B2 * | 6/2011 | Carnevali ................... 248/177.1 |
| 8,196,878 B1 * | 6/2012 | Wessells et al. ........... 248/163.1 |
| 2005/0092877 A1 | 5/2005 | Carnevali |
| 2005/0205724 A1 | 9/2005 | Carnevali |
| 2005/0205730 A1 | 9/2005 | Carnevali |

OTHER PUBLICATIONS http://www.bentleytechnologies.com/MM004.ASP?pageno=23: SpyderPod—Date unknown—Wayback Machine (http://web.archive.org/) shows similar webpages Aug. 10, 2001 and later.

* cited by examiner

MULTIUSE DEVICE MOUNTING SYSTEM AND METHOD

CROSS REFERENCE TO RELATED APPLICATIONS

This application is a continuation of U.S. patent application Ser. No. 12/885,513, filed 19 Sep. 2010 (now U.S. Pat. No. 8,196,878), which is a Division of application Ser. No. 10/618,847 filed on Jul. 14, 2003 (now U.S. Pat. No. 7,798,452), the contents of which are hereby expressly incorporated by reference in its entirety for all purposes.

BACKGROUND OF THE INVENTION

The present invention relates generally to a device mounting system and more specifically to an apparatus including one or more flexible shape-retaining shafts for engaging, holding and pointing "things" (e.g., imaging devices like cameras or video recorders).

Portability is an important characteristic of many devices in use today, and in many cases the usefulness of the device is directly related to its efficiency in a portable mode. One particular class of device for which this is true is the class of imaging devices. This class includes portable cameras of all sorts including digital cameras and video cameras. These portable cameras range widely in size from the very small to the barely portable. Common uses of the portable camera include applications requiring particularly steady positioning and operation as well as remote operation.

The camera art has developed the tripod as a mounting system for engaging and holding the portable camera. It satisfies the requirements of providing a platform for steady positioning and operation, and permits easy remote operation. Many different tripods have been developed to address concerns with size and weight, as well as to adapting a camera to an imaging environment.

Tripods have an inherent disadvantage in that they require a stable, nearly planar surface upon which to be set up. Telescoping legs make the tripod somewhat adaptable to uneven surfaces. It is often the case that the more complex and adaptable the tripod is, the more inconvenient and difficult it is to setup. The more inconvenient and difficult it is to setup a tripod inhibits its use notwithstanding its usefulness.

The art has seen solutions to some of the drawbacks of the tripod, such as the requirement for a suitable, nearly flat, stable surface upon which to setup. One solution has been to mount a camera to the tripod, then lash the tripod to another nearby object using separate cords such as one or more bungee cords.

The present invention makes use of flexible shape-retaining shafts. It is known to provide flexible shape-retaining shafts in other contexts, such as for illumination systems or other lightweight device to be powered from an attendant portable electronic device. For example, the Snakelight Flexible Flashlight available from Black and Decker, 626 Hanover Pike, Hampstead, Md. 21074 as well as the Flylight™ and the FlyFan™ available from Kensington Technology Group, 2000 Alameda de las Pulgas, Second Floor, San Mateo, Calif. 94403-1289 are examples of prior art devices that have flexible shape-retaining shafts for positioning a device in a desired location.

The Snakelight provides a self-powered flashlight unit for hands-free lighting by bending, coiling draping or wrapping the flexible core in virtually any way to direct a light at one end as desired. The Flylight™ and the Flyfan™ provide for devices powered from the batteries of a portable electronic device (e.g., a laptop computer) through a port (e.g., a USB port of the laptop). Each device has a specialized function and includes a powered option for an active component integrated into a head of the device.

BRIEF SUMMARY OF THE INVENTION

The present invention is a multiuse platform and system having a flexible shape-retaining shaft for engaging, holding and pointing devices (e.g., imaging devices like cameras or video recorders, though other devices and objects may also be used in cooperation with the device). The present invention includes a respositionable mounting system having a flexible assembly having a first end and a second end, the assembly adapted to be repetitively positioned into a plurality of orientations by moving the assembly into a first particular orientation wherein the assembly retains the particular orientation until the assembly is moved into a second particular orientation; and a first mounting head, coupled to the first end, for engaging a first mating receptacle.

The preferred embodiment permits simple efficient setup, use and storage of a device mounting system. When used in conjunction with an imaging device, the preferred embodiment allows the imaging device to be quickly positioned into a desired orientation that is steady in many different environments.

These and other novel aspects of the present invention will be apparent to those of ordinary skill in the art upon review of the drawings and the remaining portions of the specification.

DETAILED DESCRIPTION OF THE INVENTION

Figure 1:
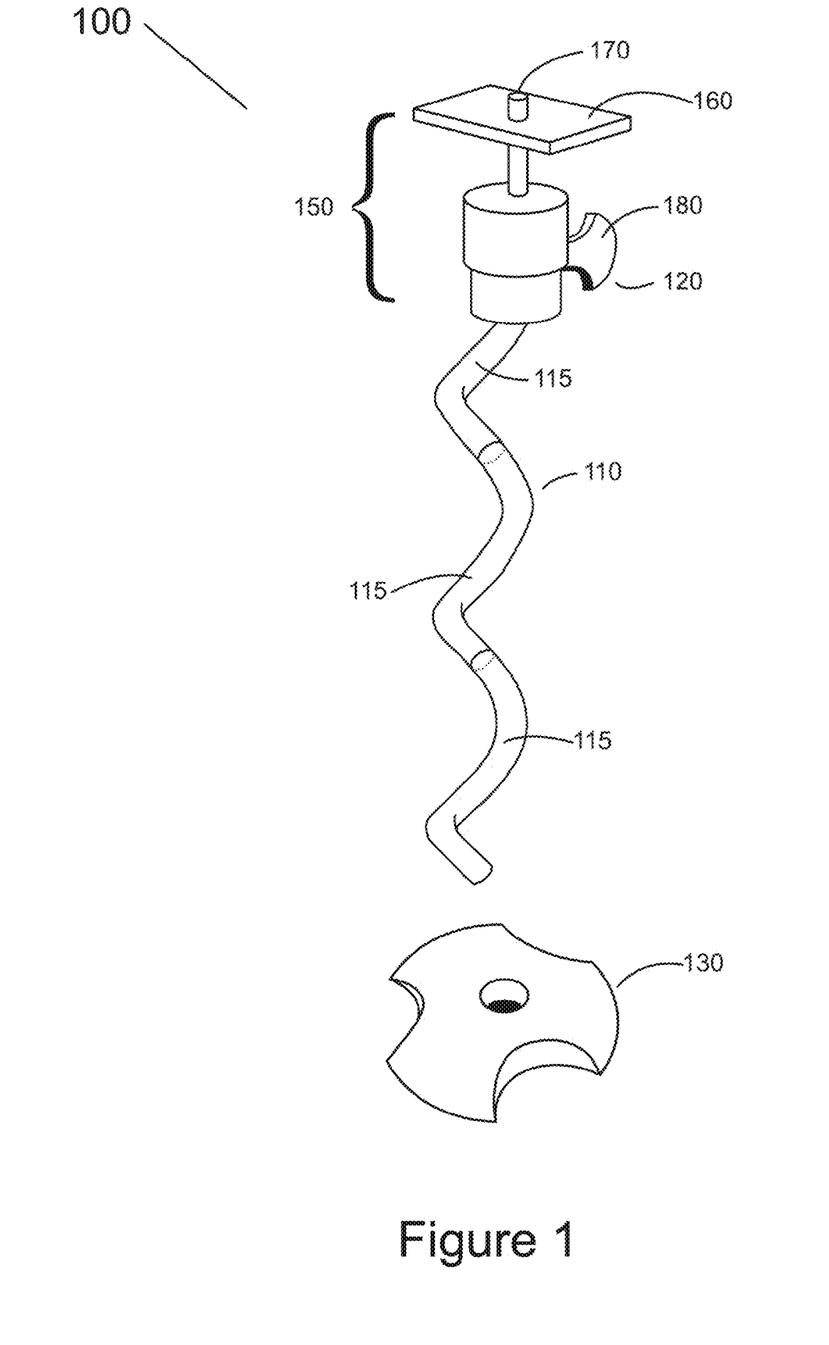
FIG. 1 is a perspective view of a set of components for a preferred embodiment of a multiuse mounting system in a single-legged mode.

FIG. 1 is a perspective view of a set of components for a preferred embodiment of a multiuse mounting system 100. Flexible assembly 110 may be made in any number of different ways depending upon the particular application and type or types of devices to be used in conjunction with system 100. U.S. Pat. No. 5,765,938 entitled "Sleeve Retention For Flexible Core Of a Flashlight" and issued on 16 Jun. 1998 (hereby expressly incorporated by reference for all purposes) describes one suitable flexible shape-retaining shaft that may be easily adapted to the present invention. When desired, system 100 may be compactly coiled into a small convenient size for storage and transportation. For use, system 100 is easily uncoiled and attached to a device and suitable support, either in a freestanding support mode or an engaging support mode as will be later described.

Assembly 110, assembled from members 115, is constructed to be bent, twisted, coiled, draped, wrapped, torsioned, curved, bowed, arched, curled, spiraled, and/or turned into a desired configuration while supporting head 120 and a selected device coupled to head 120. Some applications may require sturdier construction for relatively heavy devices or high use environments where a flex range limit of assembly 110 is frequently tested. Other applications for lighter devices or for uses not requiring particularly steady positioning may use a lighter construction. As explained below, including the discussion of FIG. 4, assembly 110 is formed from intercoupling two or more members 115 together. Members 115 correspond to members 405 shown in FIG. 4 through FIG. 7.

Mounting head 120 of the preferred embodiment includes an engagement system 150 adapted for the type of device to be used with system 100. For example, many imaging devices include a standard sized and threaded mating receptacle (e.g., a tripod screw adapter or hole) on one side for attaching a tripod or other structure. Other imaging devices are provided with a specialized or proprietary mating receptacle. Engagement system 150 of the preferred embodiment is complementary to the mating receptacles used with the devices for which system 100 is intended to be used. In some cases, engagement system 150 may be used in cooperation with an adaptor for increasing the types of mating receptacles that may be used with the present invention.

The preferred embodiment illustrates system 100 configured for use with a standard tripod screw hole. In this case, engagement system 150 includes a mounting plate 160 and a standard tripod screw 170 extending above a surface of plate 160. In use after engagement of mounting head 120 with a device, plate 160 supports the device and screw 170 secures the device to system 100. As discussed above, other devices may require use of a different engagement system or an adapter for use with engagement system 150. For purposes of the present application, mount includes engagement system 150 and other systems for gripping, holding, securing, clipping, grabbing, snapping, screwing, clamping, buttoning, and all other manner of attaching, holding and/or securing one device to another (preferably using a releasable/reusable system/method).

Mounting head 120 optionally includes an ergonomic handle 180 used as an aid to move and position mounting head 120 as desired. Optionally, mounting head 120 may include a moveable coupling between engagement system 150 and assembly 110 or between mounting head 120 and assembly 110 permitting further refinements of device orientation without necessarily changing an orientation of assembly 110.

Base 130 of the preferred embodiment is selectively mountable and dismountable to an end of assembly 110 opposite of an end having mounting head 120. Base 130 permits system 100 to become freestanding above a surface supporting base 130. The surface does not have to be particularly flat, level or even. System 100 having base 130 installed and supporting a generally vertical assembly 110 is termed a freestanding support mode. System 100 also includes an engaging support mode in which system 100 interacts with the environment other than through base 130 to support a device for use and/or operation.

The engaging support mode may be easier to implement for a user when base 130 is detached, but not all applications require detachment of base 130. It is an advantage of system 100 is that when base 130 is detached and system 100 is in the engaging support mode, assembly 110 may have a second end (the end from which base 130 was detached) available for supporting a second mounting head or other function, for example simply by addition of a second mounting head 120 (not shown). The second mounting head could permit two imaging devices to be used concurrently, or the second mounting head could support a second device providing complementary feature or functions to the first device or to the operation. For example, a detachable self-powered illumination system could be used with the second mounting head, or a reflector/illumination system or other appropriate device may be used.

In some applications, base 130 may not be detachable, but mounted intermediate two ends of assembly 110. This implementation permits two or more mounting heads to be used concurrently with base 130.

In other applications, base 130 may include a controller or power source, or a port for attaching a controller or power source, for communicating with the devices through communication channels provided in assembly 110 and accessible using data/power connectors in mounting head 120. The communication could be for control or coordination of functions of the devices, or other functions built into mounting head 120.

Figure 2:
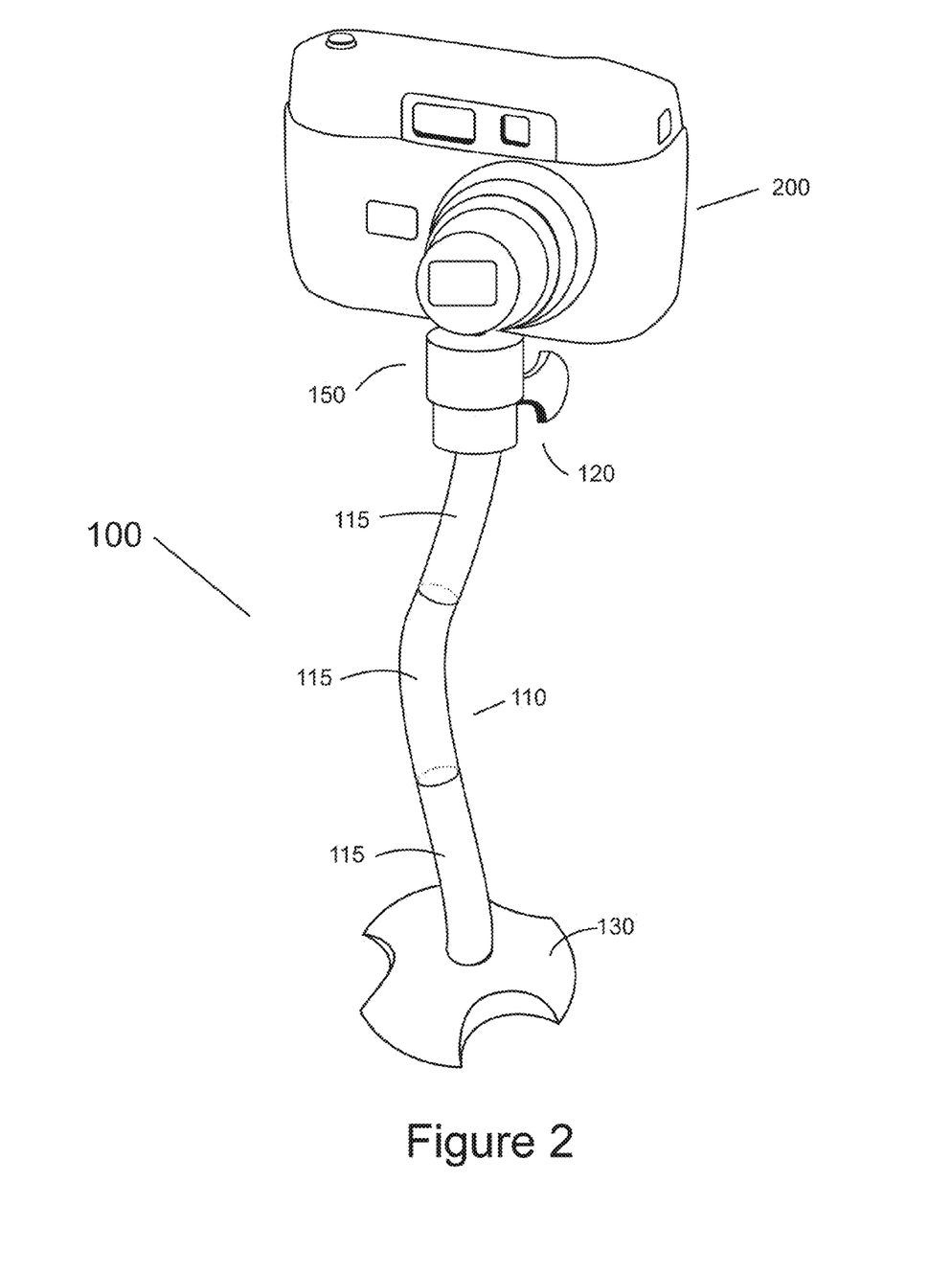
FIG. 2 is a perspective view of the multiuse mounting system shown in FIG. 1 engaging an imaging device in a freestanding support mode.

FIG. 2 is a perspective view of multiuse mounting system 100 shown in FIG. 1 engaging an imaging device 200 in the freestanding support mode. Device 200, secured to system 100, may be oriented into virtually any position. The orientation aims device 200 in any direction in three-dimensions and permits a height adjustment from near a height at a level near base 130 up to a maximum length of assembly 110 when assembly 110 is straight and unbent and extending away from base 130. In some cases and configurations, it is possible to adjust a height of device 200 to be below base 130 such as when base 130 is near an edge and base 130 and assembly 110 can counterbalance the particular orientation.

Figure 3:
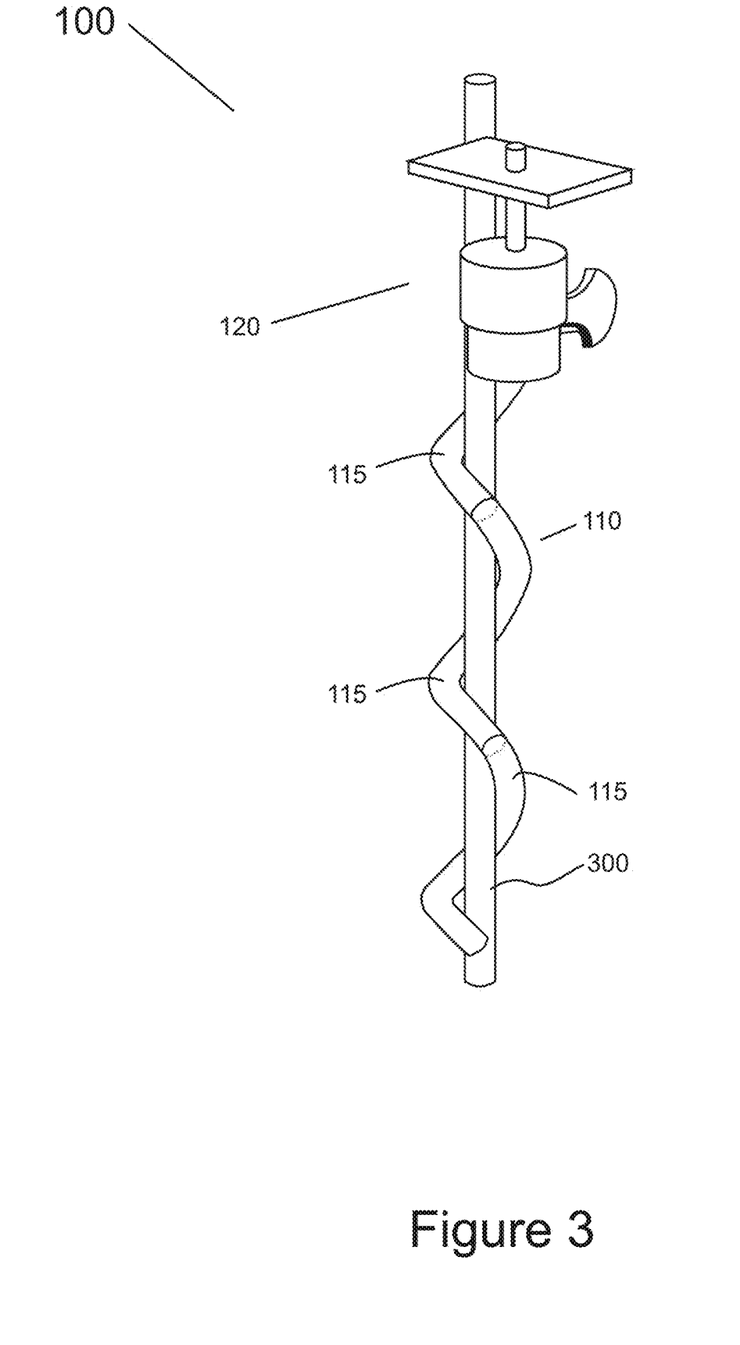
FIG. 3 is a perspective view of the multiuse mounting system shown in FIG. 1 used in an engaging support mode.

FIG. 3 is a perspective view of multiuse mounting system 100 shown in FIG. 1 used in the engaging support mode. Engaging support mode includes establishing some other relationship (e.g., wrapping, draping, coiling, coiling, and the like) between system 100 and object 300 to secure system 100 to object 300. As shown in FIG. 3, assembly 110 is wrapped about object 300 when object extends vertically. Object 300 could be a pole, a limb, a support column, a chair leg, a tree branch or virtually any other object. Object 300 need not be vertical, but it could be horizontal or assume some arbitrary angle. Attaching a device to system 100 shown in FIG. 3 permits the device to assume virtually any desired orientation relative to object 300.

Figure 4:
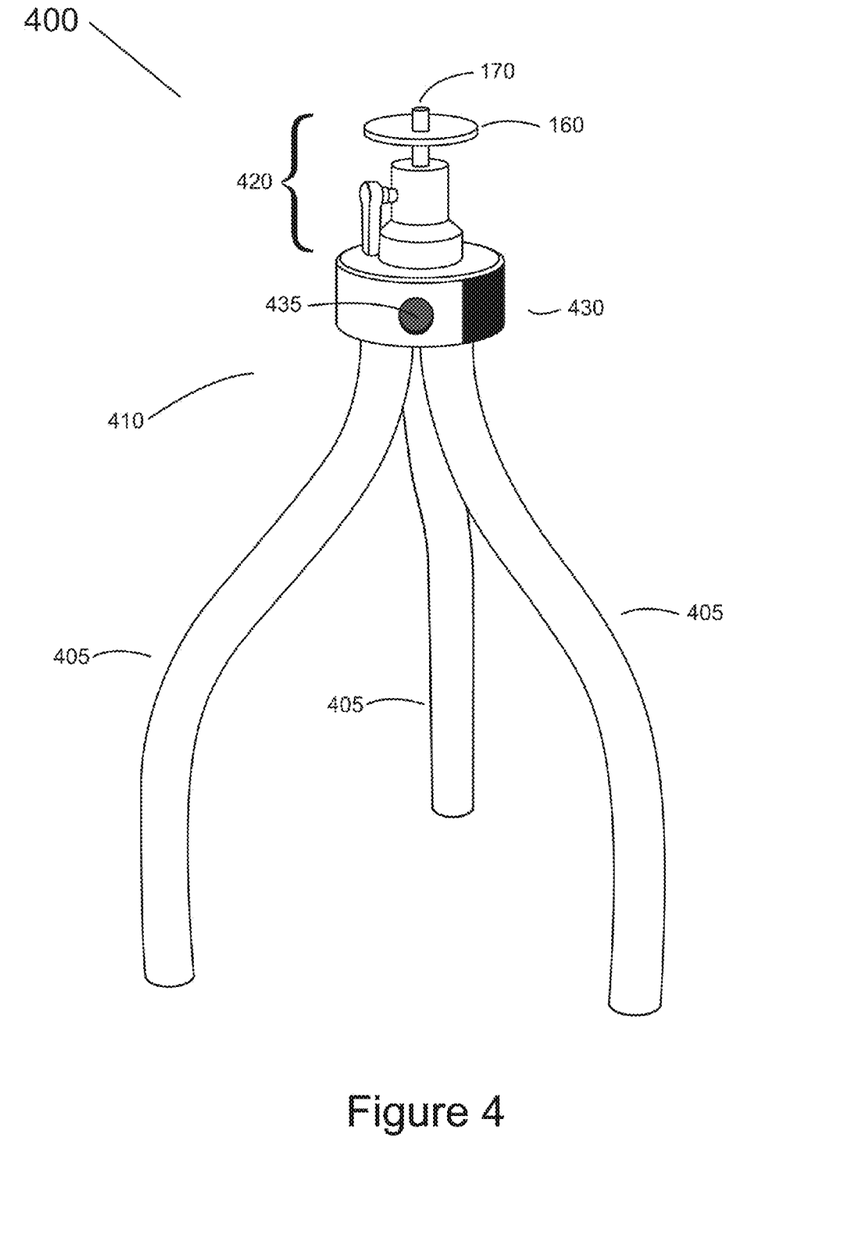
FIG. 4 is a perspective view of the preferred embodiment in a multi-membered mode.

FIG. 4 is a perspective view of the preferred embodiment for a multiuse device system 400 in a multi-membered mode. System 400 includes three flexible members 405 (shown combined as assembly 110 in FIG. 1) and a modified version of mounting head 120 to provide a "tripod" mounting head 410 that engages a plurality of members 405 (e.g., three flexible members 405 to form assembly 110 as shown in FIG. 1) in tripod mode. Mounting head 410 includes a mount system 420 and a member attachment system 430. System 400 is transformable into system 100 shown in FIG. 1 through FIG. 3 by detaching two members 405 from head 410 and coupling all three members 405 together to form a single long flexible assembly 110 coupled to head 410. Depending upon the desired implementation, a base 130 shown in FIG. 1 may be added as well.

Each member 405 includes a coupler (e.g., an extended threaded member—not shown—though other engagements systems like snap couplers or ball/socket systems may be used) at a first end. The coupler engages a complementary receptacle provided in head 410 (e.g., provided in an underside of member attachment system 430). In the preferred embodiment, member attachment system 430 includes three mating receptacles on the underside (not shown), as well as one or more mating receptacles 435 on the sidewall. Additionally, mount system 420 is preferably coupled to member attachment system using a similar engagement system to permit member 405 to be inserted between mount system 420 and member attachment system 430 (as shown later in FIG. 5). Each second end of member 405 includes a similar complementary receptacle to permit members 405 to be coupled together to form a single long flexible assembly coupled to head 410, thus recreating the structure shown in FIG. 1 through FIG. 3. Decoupling members 405 from each other and reengaging members 405 to head 410 recreates the tripod mode.

Figure 5:
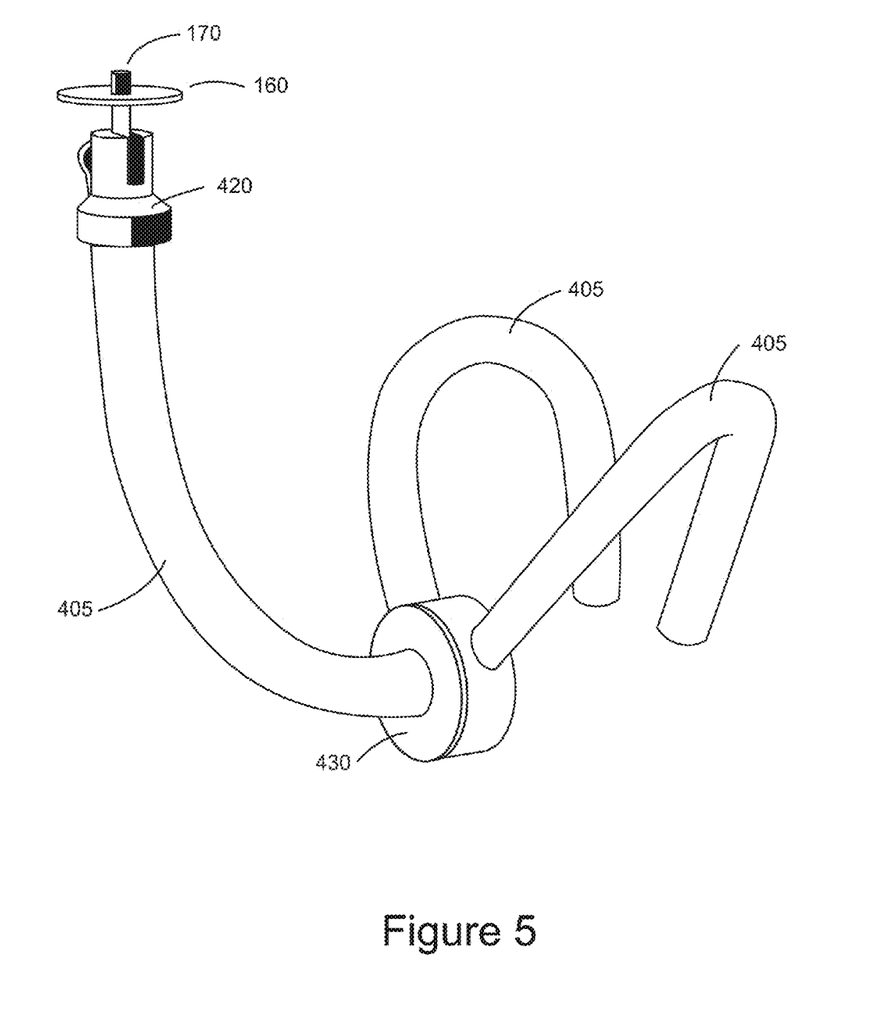
FIG. 5 is a perspective view of the preferred embodiment shown in FIG. 4 configured for draping over a horizontal member (e.g., a back of a chair)

FIG. 5 is a perspective view of system 400 shown in FIG. 4 configured for draping over a horizontal object (e.g., a back of a chair). In this configuration, mount system 420 and member attachment system 430 are separated with a flexible member 110 removed from an underside of member attachment system 430 and inserted between them. The other two members 110 are moved from the underside of system 430 to the sidewall. The two sidewall-mounted members 110 engage the horizontal object to position and secure leg attachment system 430 in a specific location. Mounting system 420 is then adjustable relative leg attachment system 430 to position any device attached to screw 170 and/or plate 160.

Figure 6:
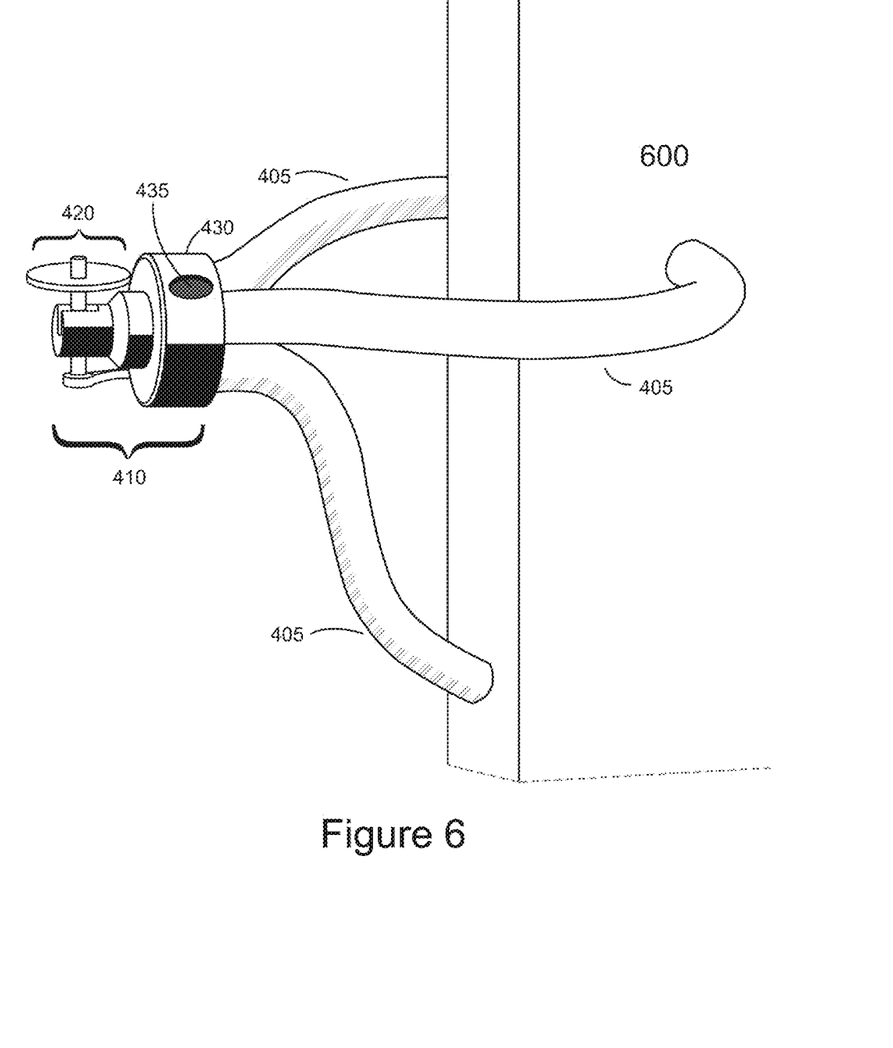
FIG. 6 is a perspective view of the preferred embodiment shown in FIG. 4 configured for engagement with a vertical wall abutment.

FIG. 6 is a perspective view of system 400 shown in FIG. 4 engaging a vertical rectangular abutment 600 (e.g., an end of a wall). In this use, flexible members 110 are preferably configured for lateral engagement by use of a suitable material on one or more exterior portions of members 110, or use of lateral engagement structures incorporated into one or more members 110. A suitable material would be one having a relatively high coefficient of friction in cooperation with the abutment 600. As the coefficient of friction is a relative measurement between two surfaces, the suitable material would one that exhibits the desired frictional force in the particular implementation. Certain materials, such as for example Latex®, have a high coefficient of friction relative to many surfaces and materials, and is the preferred material for this type of implementation to produce a surface that is "sticky" to a large number of surfaces.

Additionally, one or more flexible members 110 may be provided with lateral engagement surfaces, either as an intentional additional element or elements to facilitate positioning and engagement of system 400, or as a consequence of the manufacture of flexible member 110. For example, the preferred embodiment for flexible members 110 uses a series of interconnected balls that impart a non-uniformly cylindrical surface over its length, forming successive annular peaks and valleys as moving along its length. The natural annular peak and valley structures may be enhanced for the particular application, and in some implementations, only selected portions of the member may be sticky. For purposes of the present application, the term "sticky" includes not only a surface with a relatively high coefficient of friction with respect to intended surfaces for interaction, but also includes assemblies having lateral engagement surfaces or other types of gripping/grabbing structures (e.g., hooks or grippers) along the length or at the end of a member, or a combination of such elements.

In operation, system 400 is oriented generally horizontal, with two members 100 forming "lateral" engagement "arms" and a third member 110 forming a lower support "leg" for cooperative engagement with vertical abutment 600. Edges of abutment 600 engage the valleys of the two lateral members 110, the "sticky" exterior and the shape-retaining manufacture maintain the engagement, thereby maintaining system 400 attached. Additionally, the support leg 110 engages a front surface of abutment 600. The three members 110 thus cooperatively maintain head 410 in a desired relationship to abutment 600 to position and/or secure a device in a desired orientation.

Figure 7:
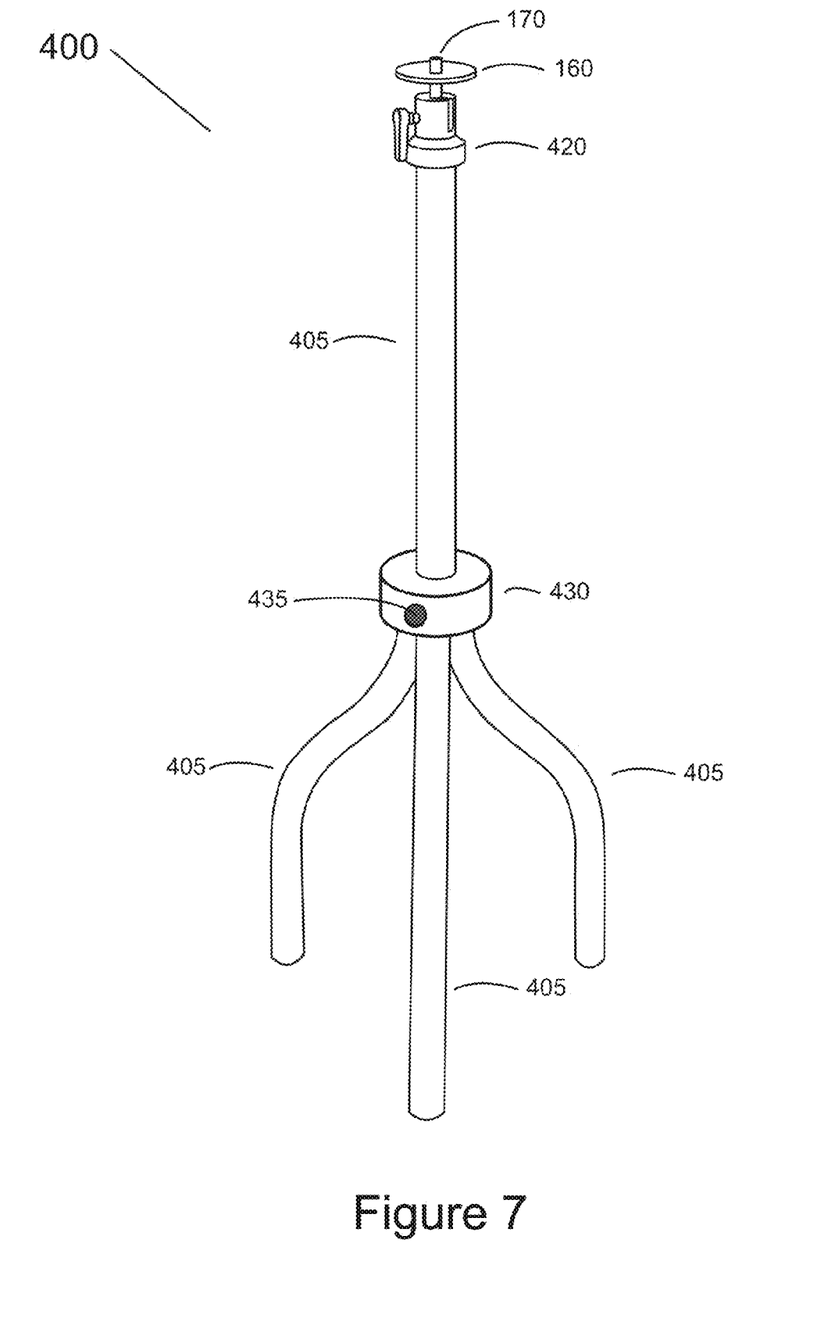
FIG. 7 is a perspective view of an alternate preferred embodiment having four members.

FIG. 7 is a perspective view of an alternate implementation of system 400 having four members 110. System 400 is adaptable for a great many uses, an example is shown in FIG. 7. As described above, leg attachment system 430 of the preferred embodiment includes mating receptacles for six flexible members 110 (three on the underside and three on the lateral surface). Each flexible member 110 includes a coupler at one end for mating to the receptacles and a receptacle for receiving a coupler, permitting daisy-chaining of two or more members 110 together to form a longer member 110. Head 410 includes a mounting system 420 and a member attachment system 430 joined together by a coupler in one and a receptacle in the other to permit one or more flexible members 110 to be inserted between. System 400 includes a base that may be used in cooperation with many particular orientations of members 110. Different types of mounts may be used in cooperation with mount system 420 for gripping, grabbing, holding, engaging, clamping, lashing, securing, etc. one or more different devices or objects. System 400 is thus able to form an interconnected web of different configurations of mounts, mounting systems, bases and members for engaging, supporting, positioning and securing virtually any device or set of devices in a desired relationship to each other and to the environment. As discussed above, the members, systems and structures of system 100 or system 400 are not limited to purely mechanical support. Bases, members, mounts and attachment systems may all be provided with power and/or data and/or communications channels use among the elements and in cooperation with the devices and/or objects supported, gripped, help, positioned, and/or secured (for example) using system 400. The preferred embodiment employs, in certain implementations, different sizes of member assemblies 110. System 400 is able to, in a single device, employ larger assemblies for one type of function (e.g., weight support) and smaller assemblies for other functions (e.g., fine positioning). Multiple types of multiple assemblies may be used. In some instances, system 400 employs adapters and/or extenders to permit construction of these elements, such as coupling one size/shape of member to another size/shape. Additionally, adapters enable further connectivity and coupling, such as by having adapters with two receptacles or two couplers. Some adapters may include multiple numbers of receptacles and/or couplers beyond two. Further, adapters may include additional power/data/communications sources, channels and or interface elements. In some instances, the mounting system may be integrated or otherwise incorporated into or become a part of a device or object. Such a mounting system may be removable, or remain permanently affixed. In such an embodiment, it may be convenient to provide storage or stowage for flexible members for instances when the device/object is used without the one or more flexible assemblies.

The types and numbers of objects, devices and "things" that may be attached, held, secured, and/or positioned using the present invention is virtually unlimited. The preferred embodiment is a device for attaching, holding, securing, and/or positioning a wide variety of imaging systems through use of standard types of mounting engagement systems used, for example, with conventional tripod devices. The present invention is not limited to use with just imaging devices, as various implementations may be used in many different contexts. For example, variations of the multiuse system may be also used for toy legs (to hold toys or objects to another toy or object), a holder for a flashlight, a support/rest for a firearm used by a marksman, "ties" or "wraps" to engage or wrap elements. The member assemblies need not be removable, but could be manufactured or relatively permanently affixed to an object. The flashlight and firearm support are examples that could be incorporated into the object. Virtually any object could be provided (during manufacture or retrofit) with a complementary mating system. A version of the member assembly could be provided in cooperation with electrical, data, pipe or other conduit (e.g., provide an assembly at five feet intervals along its length) to "lash" the conduit to a railing or other support. Such a system could provide many benefits, including temporary provision/deployment of power, water, communications, or whatever. As shown in FIG. 7, a version having four or more "members" could use three to support the other members, and the other members could actually be active devices, such as the flashlight or illumination system, lighted minor, thermometer, wireless hub transceiver. Adding a clip or cup to the additional member makes the device a general holder for signs, etc.

As shown in FIG. 1 through FIG. 3 and as further suggested above, a single member assembly having an integrated engagement system is very useful. Particularly in instances in which the assembly is a power/data/communications conduit and the engagement system includes a coupling system that connects to the desired power/data/communications channel. For example, a workspace could be outfitted with several assembly outlets, and a user is able to engage assemblies (e.g. possibly of different size, function or type) into the outlets. A suitable suite of devices (e.g., illumination, cutting, soldering, test equipment, polishing, welding, punching, drilling, etc.) may be used in cooperation with these assemblies by selectively engaging with the engagement system to provide a wide variety of tasks at the workspace. The suite of devices is designed and adapted for the range of tasks at the workspace.

The above-described arrangements of apparatus and methods are merely illustrative of applications of the principles of this invention and many other embodiments and modifications may be made without departing from the spirit and scope of the invention as defined in the claims.

These and other novel aspects of the present invention will be apparent to those of ordinary skill in the art upon review of the drawings and the remaining portions of the specification.

What is claimed as new and desired to be protected by Letters Patent of the United States is:

1. A method for positioning an imaging system including a standard mating coupler, the method comprising:
   a) adjusting each of a set of three flexible members coupled to a member attachment system selectively coupled to a mount system with a quick-connect coupler wherein said mount system is coupled to the standard mating coupler and wherein each said flexible member of said set of three flexible members comprises a flexible assembly having a proximal end coupled to said member attachment system using a quick-connect coupler and a distal end having a quick-connect coupler complementary to said quick-connect coupler at said proximal end, said flexible assembly adapted to be repetitively positioned into a plurality of orientations by moving said flexible assembly into a first particular orientation wherein said flexible assembly retains said first particular orientation until said flexible assembly is moved into a second particular orientation; and thereafter
   b) adjusting the imaging system relative to said plurality of flexible members by flexing one or more of said flexible members; and thereafter;
   c) decoupling said proximal end of a first one flexible member of said three flexible members from said member attachment system; and
   d) coupling said proximal end of said first one flexible member to a distal end of a second one flexible member of said three flexible members using said quick-connect couplers forming a reconfigured mounting system; and thereafter
   e) supporting the imaging system using said reconfigured system; and
   f) adjusting the imaging system relative to said plurality of flexible members by flexing one or more of said flexible members.

2. A reconfigurable mounting system for an object having a mount coupler, comprising:
   three support legs, each said support leg including a flexible assembly having a proximal end with a quick-connect coupler and a second end having a quick-connect coupler matable to said quick-connect coupler of said proximal end, each said assembly adapted to be repetitively positioned into a plurality of orientations by moving said assembly into a first particular orientation wherein said assembly retains said first particular orientation until said assembly is moved into a second particular orientation; and
   a body including three quick-connect couplers matable to said quick-connect couplers at said proximal ends and an object coupler matable to the mount coupler;
   said reconfigurable support system forming a tripod in a first mode with said quick-connect couplers at said proximal ends of said support legs mated to said quick-connect couplers of said body;
   said reconfigurable support system forming an elongate support in a second mode with one quick-connect coupler at said proximal end of a first one of said support legs mated with said body and one quick-connect coupler at said proximal end of a second one of said support legs mated to said quick-connect coupler of said distal end of said first one support leg.

3. The reconfigurable mounting system of claim 2 further comprising an adapter, coupled to said body using said object coupler and coupled to the object using the mount coupler.

4. A method for positioning an imaging system including a standard mating coupler, the method comprising:
   a) adjusting each of a set of three flexible members coupled to a member attachment system selectively coupled to a mount system with a quick-connect coupler wherein said mount system is coupled to the standard mating coupler and wherein each said flexible member of said set of three flexible members comprises a flexible assembly having a proximal end coupled to said member attachment system using a quick-connect coupler and a distal end having a quick-connect coupler complementary to said quick-connect coupler at said proximal end, said flexible assembly adapted to be repetitively positioned into a plurality of orientations by moving said flexible assembly into a first particular orientation wherein said flexible assembly retains said first particular orientation until said flexible assembly is moved into a second particular orientation; and thereafter b) adjusting the imaging system relative to said plurality of flexible members by flexing one or more of said flexible members; and thereafter;
c) decoupling said proximal end of a first one flexible member of said three flexible members from said member attachment system; and
d) coupling said proximal end of said first one flexible member to a distal end of a second one flexible member of said three flexible members using said quick-connect couplers forming a reconfigured mounting system; and thereafter
e) supporting the imaging system using said reconfigured system.

\* \* \* \* \*